United States Patent [19]  [11] 4,115,496
Krall  [45] Sep. 19, 1978

[54] METHOD FOR MOLDING A THREADED BUNGHOLE

[75] Inventor: Thomas J. Krall, Toledo, Ohio
[73] Assignee: Owens-Illinois, Inc., Toledo, Ohio
[21] Appl. No.: 810,767
[22] Filed: Jun. 28, 1977
[51] Int. Cl.$^2$ .......................... B29C 5/06; B29D 23/03
[52] U.S. Cl. ........................................ 264/94; 264/322
[58] Field of Search ................ 264/94, 98, 320, 322; 425/525, 528

[56] References Cited
U.S. PATENT DOCUMENTS

| 3,090,079 | 5/1963 | Gottschald | 264/320 |
| 3,487,501 | 1/1970 | Siard et al. | 264/94 |

*Primary Examiner*—Willard E. Hoag
*Attorney, Agent, or Firm*—Charles S. Lynch; Richard D. Heberling

[57] ABSTRACT

A method for molding a threaded bunghole in a blow-molded article is disclosed. The method comprises the steps of: positioning a parison between open mold sections, partially extending a threaded pin assembly into one end of the parison, partially closing the mold sections, fully extending the pin assembly when the threads on the pin assembly are filling up with a portion of the parison, completing closure of the mold sections, and then expanding the parison into contact with the blow cavity formed by the mold sections.

3 Claims, 5 Drawing Figures

METHOD FOR MOLDING A THREADED BUNGHOLE

BACKGROUND OF THE INVENTION

The present invention relates to the art of blowmolding freestanding plastic drums, and more specifically to an improved method for forming bungholes in blowmolded drums.

Plastic drums are often manufactured by extruding a tubular parison into a chamber defined by open mold sections, inserting a blow pin into at least one end of the parison, closing the mold sections which compresses a portion of the parison against the blow pin to form the bunghole, blowing air through the blow pin and into the parison so as to expand the remainder of the parison into contact with the interior surface of the closed mold, opening the mold, and then removing the final blown article from the mold and the blow pin.

In such a method, the blow pin generally has an annular shoulder which forms a sealing surface on the molded bunghole for abutting a reciprocal surface on the bung or closure. Additionally, the blow pin assembly generally would include means for providing the bunghole with threads for cooperative engagement with a closure. Such means might consist of threads on the blow pin itself for casting the image onto the molding plastic, or it might consist of a threaded plastic or metal insert temporarily affixed to the blow pin but over which the plastic may be molded and which remains as a part of the bunghole upon removal of the blow pin.

One of the problems associated with the sealing surfaces of bungholes made by the above method is that the surfaces are somewhat conical, generally sloping upwardly and outwardly from the center axis of the bunghole. This requires the use of a highly elastic and compressible gasket to effect a seal.

One of the shortcomings of the compression molded plastic threads has been their poor definition leading to cross-threading and reduction of their mechanical advantage. Cross-threading or other thread damage commonly occurs in one of the following three manners: (1) the forced engagement of a difficult-to-screw-in closure or other device, (2) the force of impact under government-required drop tests (see United States Department of Transportation Regulations Governing Transportation of Hazardous Materials, Sec. 178.19, Specification 34), and (3) the gravitational leverage exerted by engaged pumping or other dispensing equipment.

SUMMARY OF THE INVENTION

The present invention is directed to the problems of bungholes in blowmolded plastic drums. It comprises improvements in the conventional method of blowmolding plastic drums. Initially a blow pin is only partially extended into an extruded thermoplastic parison such that at least some of the threads on the blow pin are within the confines of the bunghole-forming segment of the open mold sections, and then the blow pin is extended fully when the mold sections have closed far enough that the parison substantially fills those threads but before the sections have united.

Through this method, both radial and axial compressive forces are applied to the molding plastic in the bunghole region during its formation. In that manner, the image of the precisely designed blow pin exterior is more definitively acquired by the final article. Thus, the sealing surface can be made flatter and the threads can be made more refined. Additionally, since the allowable height of the bunghole protrusion is limited by practical concerns, the above described method provides a means of increasing the thread length by extending or forcing some of the threads down into the drum chamber which is otherwise inaccessible to molding. The greater thread length increases the resistance of the plastic to deformation under impact, compressive, or leverage type loads.

It is, therefore, an object of this invention to provide an improvement in the method of blowmolding plastic drums, and more specifically for forming the drum bungholes, which increaes the flatness of the sealing surface.

It is also an object to improve the definition of the threads in plastic bungholes.

It is still further an object to increase the thread length in molded plastic bungholes without increasing the height of the bunghole protrusion above the container.

Other objects and advantages of the invention will be apparent to those skilled in the art from the following detailed description of the invention, with reference made to the drawings.

DETAILED DESCRIPTION OF A PREFERRED EMBODIMENT

The drawings and the following discussion relate to a method of forming threaded bungholes in large plastic drums, but it should be understood that the principles involved are applicable to the manufacture of threaded openings in a variety of other size and shape plastic containers.

Figure 1:
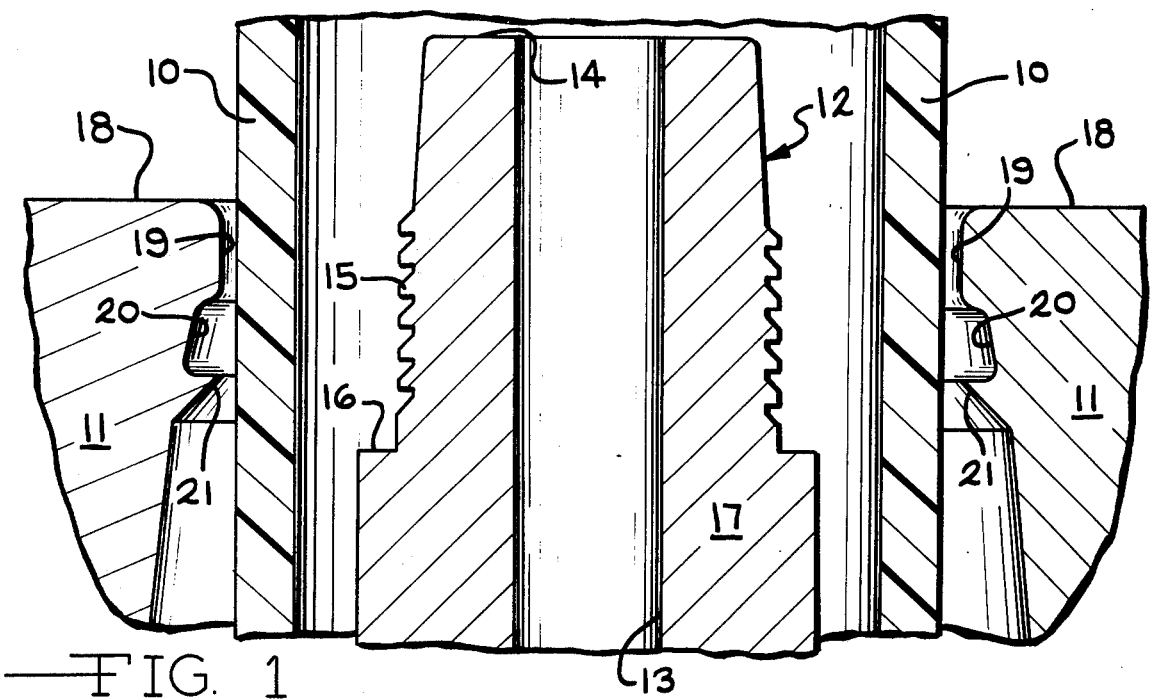
FIG. 1 is a fragmentary sectional view of a blow pin partially extended into one end of a plastic parison located between two open mold sections.

Generally, as shown in FIG. 1, in the blowmolding of large plastic drums (which is done upside-down), a tubular parison 10 is extruded downwardly between two open mold sections 11 (only the bunghole-forming portion of the mold sections 11 is revealed in the drawings) and a blow pin 12 is upwardly inserted therein. The particular blow pin 12 shown in FIG. 1 includes a blow channel 13, an end 14, threads 15, an annular shoulder 16, and a head 17. Usually the blow pin 12 will additionally contain a cooling means (not shown) for transferring heat away from the bunghole portion of the plastic drum, since that area is generally quite thick and, therefore, retains heat longer than other portions of the drum.

The open mold sections 11 include top surfaces 18 which form a blowmold cavity for defining a finished article, annular thread-compressing segments 19, recesses 20, and parison cut-off knife edges 21. Generally, the bunghole-forming portion of the mold sections 11 will also contain cooling means (not shown) for removing heat away from the bunghole portion of the plastic drum. This may consist of passages through which a heat transfer fluid is circulated.

Figure 2:
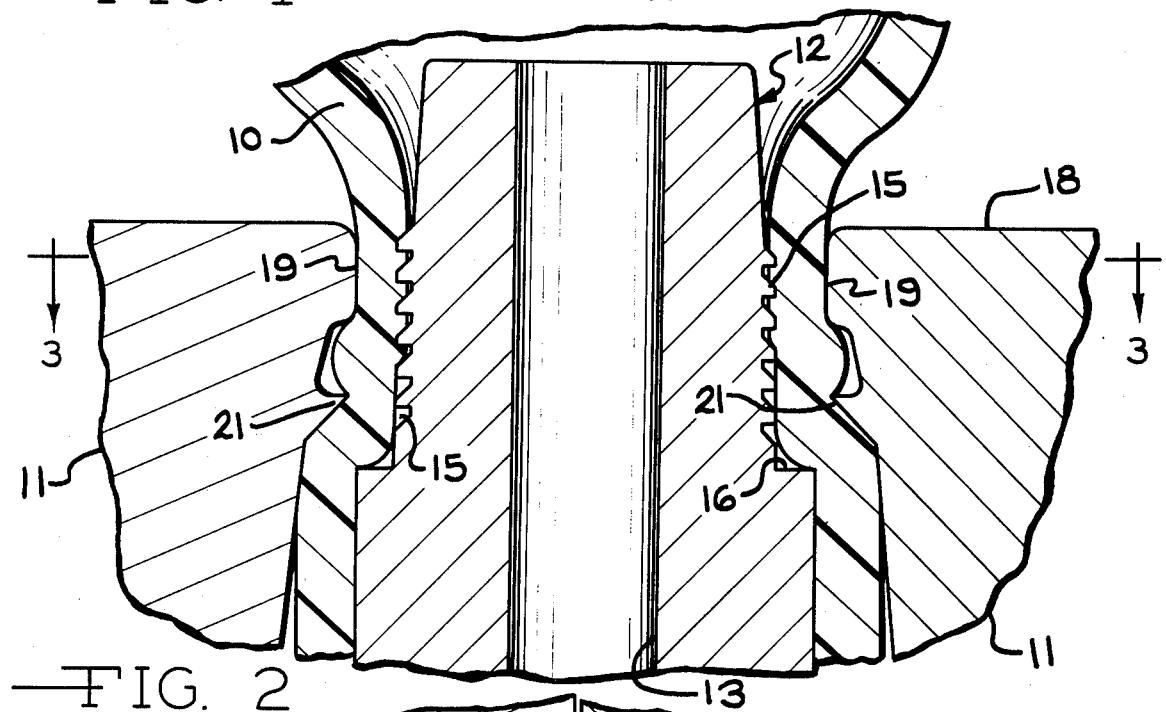
FIG. 2 is a fragmentary sectional view of the partially extended blow pin, parison, and mold sections after the mold sections have closed far enough that the parison substantially fills the initial threads on the blow pin.

Whereas, conventionally the blow pin is in the fully extended position at this stage, in accordance with the method of the present invention, the blow pin 12 in FIG. 1 is only partially extended into the parison 10. For illustrative purposes, partial extension of the blow pin 12 in FIG. 1 and FIG. 2 is made obvious by noting that a portion of the blow pin threads 15 extend below the parison cut-off knife 21. However, the exact location of the threads and the degree of blow pin extension will vary somewhat, depending upon such factors as thread length, height of the bunghole protrusion above the drum surface, and mold design, as will be explained below.

Figure 3:
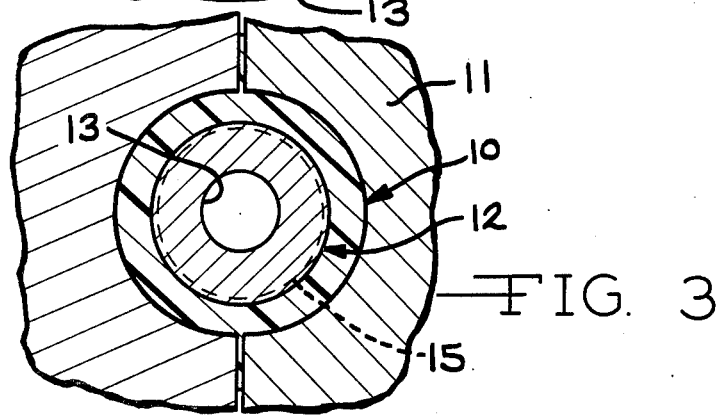
FIG. 3 is a fragmentary sectional view along line 3—3 in FIG. 2.
Figure 4:
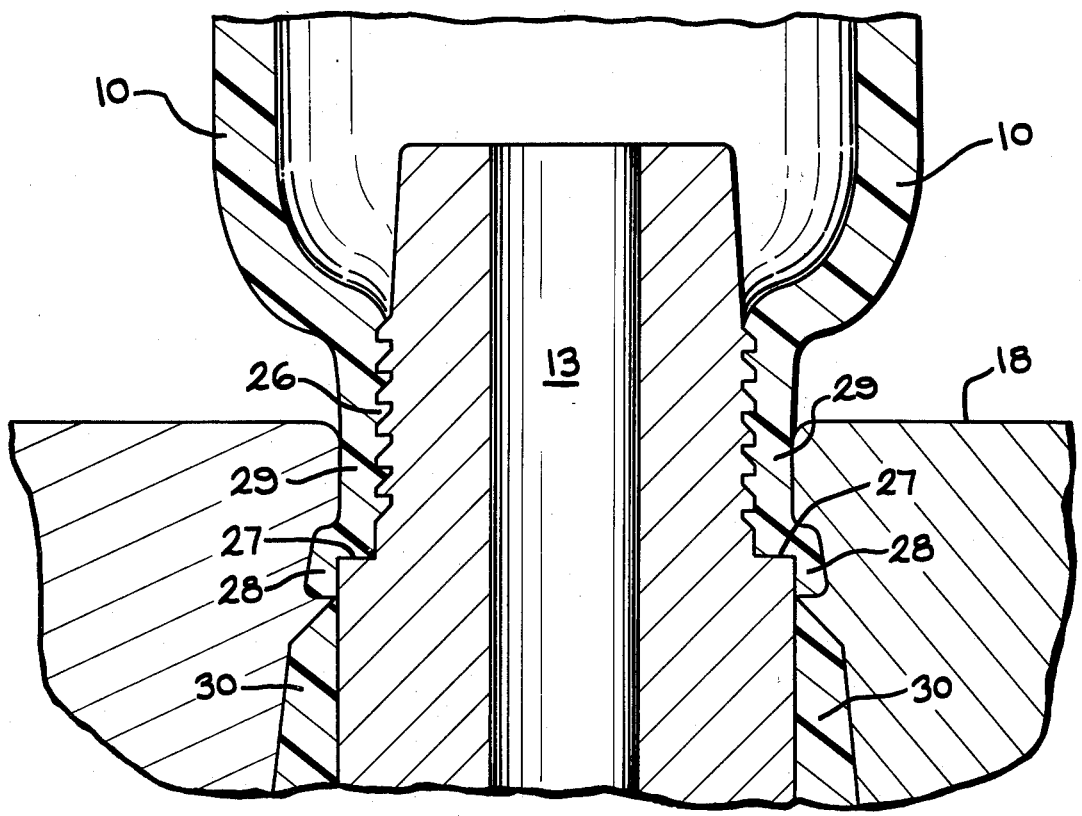
FIG. 4 is a fragmentary sectional view of the blow pin, parison, and mold sections after the blow pin has been fully extended and the mold sections have completely closed.

Next, the mold sections 11 close about the parison 10, compressing a portion of it against the blow pin 12 as shown in FIG. 2. FIGS. 2 and 3 illustrate the relative positions of the blow pin 12, parison 10, and mold sections 11 at a point when the mold sections 11 have closed far enough that the parison substantially fills the blow pin threads 15, but before the sections 11 completely shut. At this juncture, the greatest amount of compression is exerted by the narrower, thread-compressing segment 19 of the mold sections 11 and, therefore, the blow pin threads 15 adjacent thereto are filled to a greater extent than the remainder. The blow pin 12 is then fully extended and the mold sections continue to close until they are united, as shown in FIG. 4.

The full extension of the blow pin 12 while the mold sections 11 are closing results in axial as well as radial compression. In this manner, the parison 10 is more efficiently pressed to acquire the image of the blow pin threads 15 and shoulder 16. Upon complete closing of the mold sections 11, the bunghole has obtained its primary features including plastic threads 26, an annular sealing surface 27, a finish ring 28, and a neck 29. Flash 30 below the finish ring 28 has been cut off for subsequent discard or recycling to the extruder.

Figure 5:
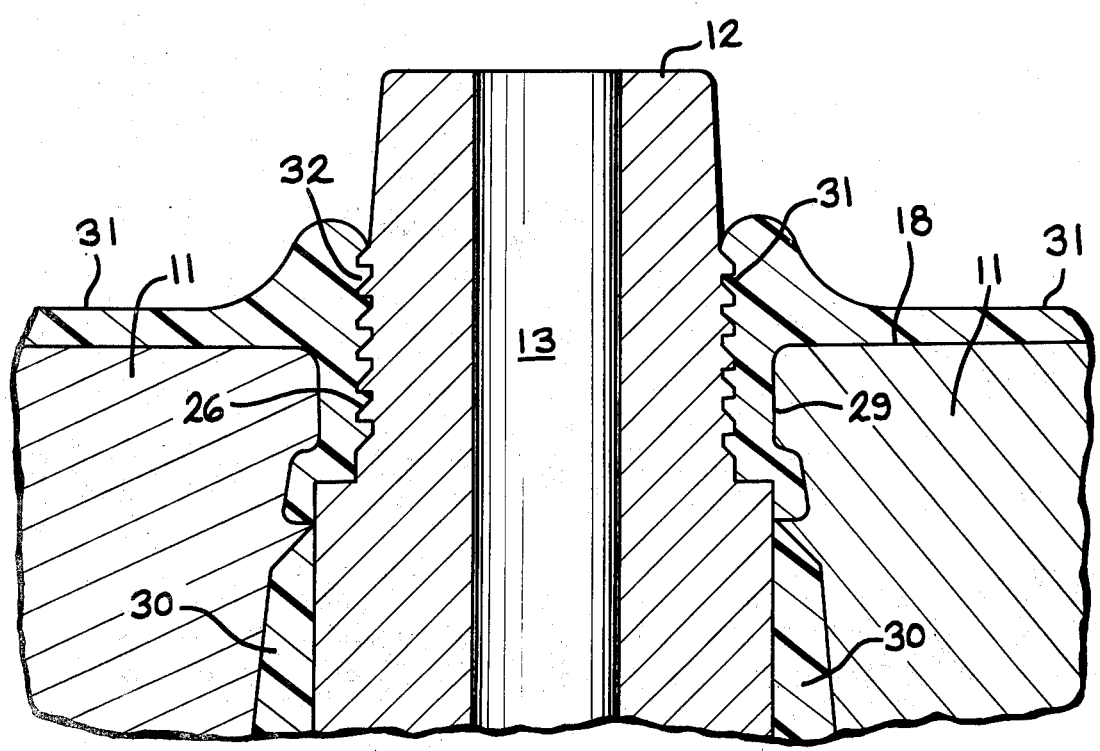
FIG. 5 is a fragmentary sectional view of the blow pin, parison, and closed mold sections after the parison has been blown to the shape of the mold.

Blow air is injected into the parison 10 through blow channel 13 in the blow pin 12 to expand the parison 10 into contact with the interior mold surfaces 18, as partially shown in FIG. 5, to complete blowing of a drum 31. It will be noted that the formed threads 26 include a section 32 which extends above the mold surface 18 and into the interior of the drum 31. After blowing, the blow pin 12 is unscrewed from the formed threads 26 and the mold sections 11 are separated to eject the drum.

Under conventional methods, without the two-step blow pin extension disclosed herein, the bunghold threads are not as well-defined and the sealing surface slopes upward and outward, similarly as appears in FIG. 2, but to a lesser degree. The two-step blow pin extension greatly improves the definition of the threads and the flatness of the sealing surface and, additionally, provides a means for molding greater thread lengths by thrusting some of the threads into the interior of the drum which is otherwise inaccessible to molding. Such a means is important where greater thread length is desired, but the allowable height of the bunghole above the drum top surface is limited. Such a limitation on the height of the bunghole is the rule, almost without exception, since the top surface of the plastic drum is purposely designed to protrude above the bunghole in some areas to provide a stacking surface.

It should be appreciated that the degree of blow pin partial extension and the timing of the blow pin full extension relative to the mold section closing cycle will vary somewhat with thread length, thread depth, mold closing speed, mold design, the type of plastic material, the parison temperature, and other variables, and must be determined by those persons skilled in the art.

What I claim is:

1. A method for molding a threaded hole in a blow-molded article comprising the steps of: positioning a parison within an interior space defined by open mold sections, said open mold sections having a main body portion and at least one compression molding portion; partially extending a threaded pin assembly into one end of said parison such that a portion of the threads on said pin assembly are within the confines of the compression molding portion of the mold sections; partially closing the open mold sections about the parison and the pin assembly to mold said portion of said threads in said parison; completing molding of threads in the parison by fully extending the pin assembly after the parison has substantially filed said portion of said threads and completely closing said mold sections and expanding the parison into contact with a blow cavity defined by the mold sections to form the blowmolded article with a threaded opening.

2. A method for molding a threaded hole in a blow-molded article, as set forth in claim 1, wherein said pin is fully extended simultaneously with completing closure of said mold sections.

3. A method for molding a threaded hole in a blow-molded article, as set forth in claim 1, wherein said pin is fully extended immediately prior to completing closure of said mold sections.

* * * * *